(No Model.)

S. P. LACEY.
SPIROMETER.

No. 471,389.  Patented Mar. 22, 1892.

Witnesses:
C. H. Fishel,
William O. Belt.

Inventor:
Samuel P. Lacey.
By Edson Bros,
his Attorneys.

UNITED STATES PATENT OFFICE.

SAMUEL P. LACEY, OF CRANFORD, NEW JERSEY.

SPIROMETER.

SPECIFICATION forming part of Letters Patent No. 471,389, dated March 22, 1892.

Application filed January 14, 1892. Serial No. 418,049. (No model.)

*To all whom it may concern:*

Be it known that I, SAMUEL P. LACEY, a citizen of the United States, residing at Cranford, in the county of Union and State of New Jersey, have invented certain new and useful Improvements in Spirometers; and I do hereby declare the following to be a full, clear, and exact description of the invention, such as will enable others skilled in the art to which it appertains to make and use the same.

My invention relates to improvements in spirometers; and the object of the invention is to provide a simple, cheap, and effective instrument for indicating the strength of a person's lungs.

With this end in view my invention consists of an instrument consisting of a tube provided at one end with a suitable mouth-piece and having an interior valve arranged near the other end, a graduated transparent tube communicating with said tube, and a piston fitted snugly within the graduated tube and having its stem normally entering the main tube.

My invention further consists of the peculiar construction and arrangement of parts, as will be hereinafter fully pointed out and claimed.

Figure 1:
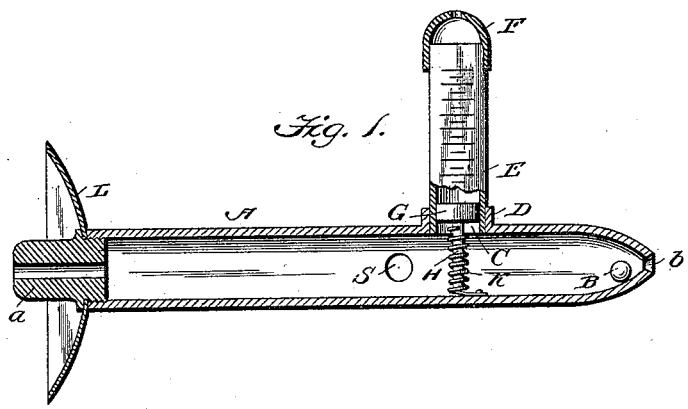
Figure 2:
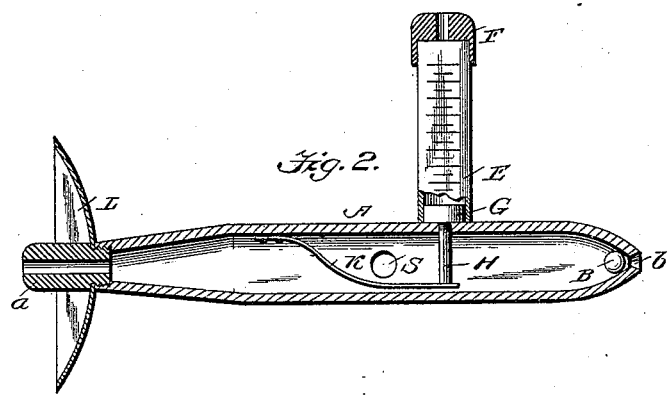
Figure 3:
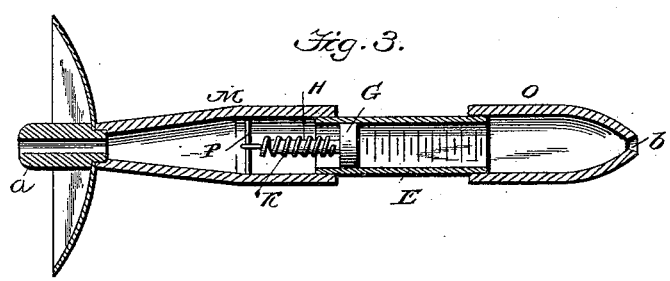

In the accompanying drawings, Figure 1 is a longitudinal sectional view through an instrument constructed in accordance with my invention. Fig. 2 is a similar view of a modified construction. Fig. 3 is a similar view of another modification.

Like letters of reference denote corresponding parts in the several figures of the drawings, referring to which—

A designates the main tube, which is made of any desired material and provided at one end with a suitable mouth-piece $a$. The other end of the main tube A is made tapering, and within this tapering portion or end of the tube is arranged a ball-valve B, which is adapted to close the outlet or opening $b$ in the tapered end of the tube.

C designates an opening or aperture formed in one side of the main tube, and around this opening is arranged a collar or raised ring D. One end of a graduated tube E is fitted within the collar or ring D around the opening C in the tube and held firmly in such position. The upper end of this tube is closed by a cap or cover F. The tube E is preferably made of glass. A piston or plunger G is snugly fitted withing the graduated tube E, and the stem H thereof extends through the opening or aperture C in the tube A and is connected to one end of a spring K, the other end of said spring being attached to the wall of the main tube. This spring K may be a coiled spring, as shown in Fig. 1, or, as shown in Fig. 2, it may be a flat spring-arm, one end of which is connected to the wall of the main tube by any suitable means and the free end of which extends under and is attached to the lower end of the stem of the piston or plunger in the graduated tube.

L designates an annular shield or plate arranged around the main tube A just beyond the rear end of the mouth-piece $a$.

S designates an opening or aperture formed in the side of the main tube A.

In Fig. 3 I have illustrated a modification of my invention in which the main tube is made up or composed of three sections M E O. The end sections M O are made of any desired material and are connected by a transparent graduated member E. In this construction the piston is arranged within the graduated member and is provided with one or more suitable valves, and the coiled spring attached to the piston has one of its ends attached to a brace or cross bar P, arranged within the member M.

The operation of my invention is as follows: The mouth-piece $a$ is placed in the mouth and air slowly inhaled until the lungs are completely filled. Then the opening S in the side of the main tube is closed by a finger of the person using the instrument and the air which has been taken into the lungs is forced out. This outward passage of air operates the valve B to close the outlet $b$, and the column of air, acting on the piston or plunger G, causes the same to move longitudinally in the tube E. A person can thus by repeated tests inform himself as to the increase in the capacity of the lungs by the distance the plunger is moved at each exhalation. When the instrument is removed from the mouth, the air within the tube is forced out through the mouth-piece and the opening S by reason of the spring K drawing the plunger or piston back to its normal position.

In using the instrument constructed as shown in Fig. 3 the mouth-piece *a* is placed in the mouth and air drawn in through the valves in the piston G until the lungs are filled. When the air is forced out of the lungs, the valves in the piston are closed and the piston moved longitudinally in the tube E.

I am aware that changes in the form and proportion of parts and details of construction of the devices herein shown and described as an embodiment of my invention can be made without departing from the spirit or sacrificing the advantages thereof, and I therefore reserve the right to make such changes as fairly fall within the scope of my invention.

Having thus fully described my invention, what I claim as new, and desire to secure by Letters Patent, is—

1. As an article of manufacture, a spirometer consisting of a main tube provided with a mouth-piece at one end and with a suitable internal valve, a transparent graduated tube communicating with the main tube, and a piston or plunger arranged within the graduated tube and having its stem extending into the main tube, substantially as described.

2. As an article of manufacture, a spirometer consisting of a main tube provided with an internal valve, a transparent graduated tube communicating with the interior of the main tube, a piston arranged within the graduated tube and having its stem extending into the main tube, and a spring arranged within the main tube and connected to the piston, substantially as described.

3. In an instrument of the character described, the combination of a main tube having at one end a suitable mouth-piece and provided with an internal valve, a transparent graduated tube communicating with the interior of and extending at right angles to the length of the main tube, a piston or plunger arranged within the graduated tube and having its stem extending into the main tube, and a coiled spring fitted around the stem and connected at one end to the piston and at its other end to the main tube, substantially as described.

4. In an instrument of the character described, the combination of a main tube provided at one end with a suitable mouth-piece and having its other end rounded or pointed, a valve arranged within the tube and adapted to close the outlet thereof through the pointed end, a transparent graduated tube having one end closed and its other end communicating with the interior of the main tube, a piston or plunger arranged within the graduated tube, a spring connected to said piston and to the main tube, and an annular shield or guard secured around the main tube near the mouth-piece, substantially as described.

In testimony whereof I affix my signature in presence of two witnesses.

SAMUEL P. LACEY.

Witnesses:
 GEO. W. DOWNS,
 EDWD. FERREIRA.